(12) United States Patent
Kikuchi et al.

(10) Patent No.: US 10,338,302 B2
(45) Date of Patent: Jul. 2, 2019

(54) LIGHT SOURCE DEVICE

(71) Applicant: Panasonic Intellectual Property Management Co., Ltd., Osaka (JP)

(72) Inventors: Takanori Kikuchi, Nagano (JP); Yusuke Kusaka, Osaka (JP); Masaru Fujita, Osaka (JP); Yoshihiko Kanayama, Hyogo (JP); Shohroh Mochida, Osaka (JP); Masami Ito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 623 days.

(21) Appl. No.: 14/435,416

(22) PCT Filed: Nov. 8, 2013

(86) PCT No.: PCT/JP2013/006587
§ 371 (c)(1),
(2) Date: Apr. 13, 2015

(87) PCT Pub. No.: WO2014/076914
PCT Pub. Date: May 22, 2014

(65) Prior Publication Data
US 2015/0293296 A1    Oct. 15, 2015

(30) Foreign Application Priority Data
Nov. 14, 2012  (JP) .................................. 2012-249836

(51) Int. Cl.
*F21V 8/00* (2006.01)
*G02B 6/00* (2006.01)

(52) U.S. Cl.
CPC ......... *G02B 6/0061* (2013.01); *G02B 6/0038* (2013.01); *G02B 6/0051* (2013.01)

(58) Field of Classification Search
CPC .. G02B 6/0038; G02B 6/0035; G02B 6/4214; G02B 6/0055; G02B 6/0058
(Continued)

(56) References Cited

U.S. PATENT DOCUMENTS 6,883,924 B2 *  4/2005  Maeda ................. G02B 6/0028
                                                         362/23.13
8,203,667 B2 *  6/2012  Chang ................. G02B 6/0038
                                                         349/65
(Continued)

FOREIGN PATENT DOCUMENTS

CN    102116892    7/2011
CN    102177447    9/2011
(Continued)

OTHER PUBLICATIONS

English Translation of Chinese Search Report dated Mar. 22, 2016 for the related Chinese Patent Application No. 201380056887.X.
(Continued)

*Primary Examiner* — Alexander K Garlen
*Assistant Examiner* — Eric T Eide
(74) *Attorney, Agent, or Firm* — Panasonic IP Management; Kerry S. Culpepper

(57) ABSTRACT

A light source device including a light guide plate and a light source, in which the light guide plate includes an incident surface on which light emitted from the light source is incident, an emission surface emitting light incident from the incident surface, and a propagating reflection surface which is a surface opposite to the emission surface and which propagates and reflects the light incident from the incident surface toward the emission surface, the propagating reflection surface has approximately V-shaped grooves and the V-shaped grooves have two kinds of grooves.

9 Claims, 15 Drawing Sheets

(58) Field of Classification Search
USPC .......... 362/620, 606, 97.1–97.4; 345/84
See application file for complete search history.

(56) References Cited

U.S. PATENT DOCUMENTS

| | | | |
|---|---|---|---|
| 2004/0085748 A1* | 5/2004 | Sugiura | G02B 6/0028 362/610 |
| 2006/0050531 A1 | 3/2006 | Tsuda | |
| 2007/0217227 A1* | 9/2007 | Watanabe | G02B 6/0038 362/615 |
| 2008/0137346 A1* | 6/2008 | Ohta | G02F 1/13362 362/309 |
| 2009/0316064 A1* | 12/2009 | Kono | G02B 6/009 349/58 |
| 2009/0316072 A1 | 12/2009 | Okumura et al. | |
| 2010/0060601 A1 | 3/2010 | Oohira | |
| 2011/0109533 A1* | 5/2011 | Suzuki | G02B 6/0038 345/84 |
| 2011/0228387 A1* | 9/2011 | Shiau | G02B 5/045 359/463 |
| 2011/0280004 A1 | 11/2011 | Shimada et al. | |
| 2011/0299013 A1 | 12/2011 | Ishida et al. | |

FOREIGN PATENT DOCUMENTS

| | | |
|---|---|---|
| CN | 102326020 | 1/2012 |
| JP | 2004-200128 | 7/2004 |
| JP | 2006-066128 | 3/2006 |
| JP | 2006-155994 | 6/2006 |
| JP | 2010-027307 | 2/2010 |
| JP | 2010-123400 | 6/2010 |
| WO | 2009/157352 | 12/2009 |

OTHER PUBLICATIONS

International Search Report of PCT application No. PCT/JP2013/006587 dated Feb. 10, 2014.

* cited by examiner

[FIG. 2B]
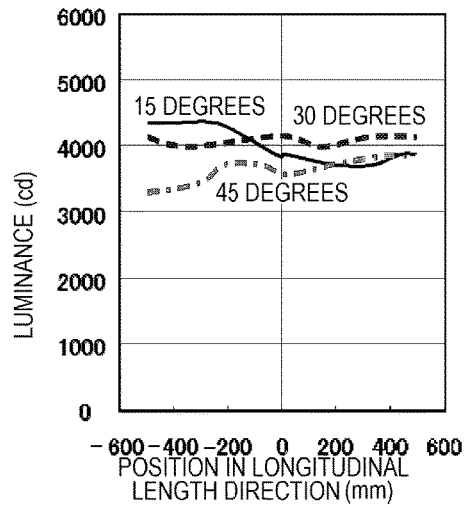
[FIG. 2C]
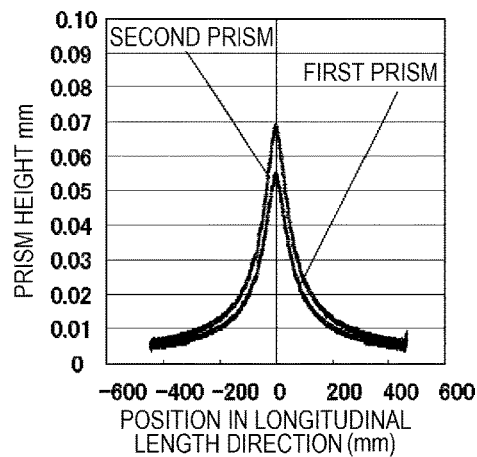
[FIG. 2D]
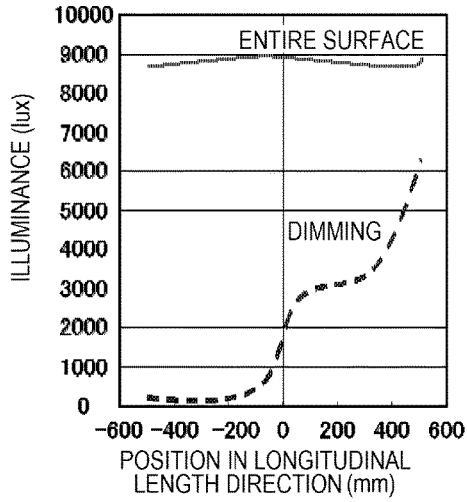

[FIG. 2E]
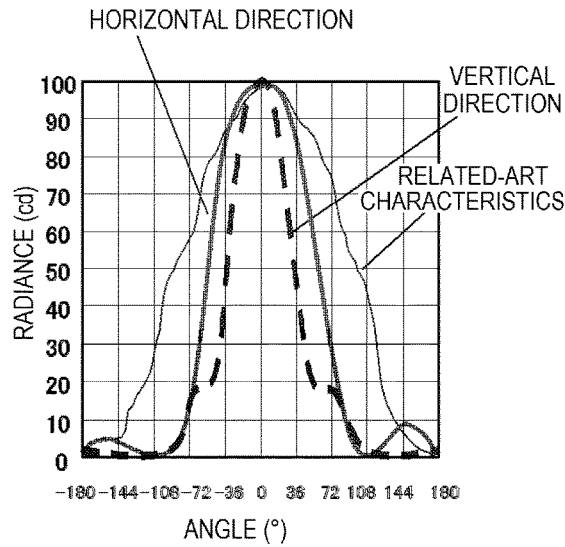
[FIG. 3A]
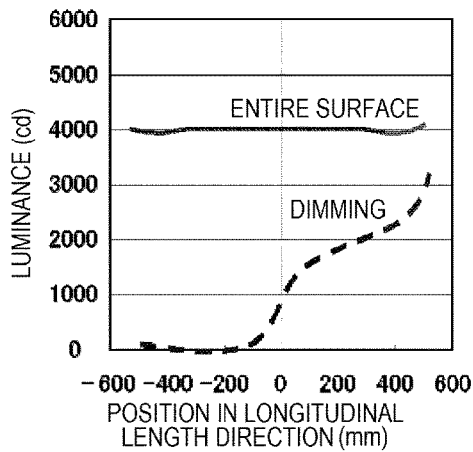
[FIG. 3B]
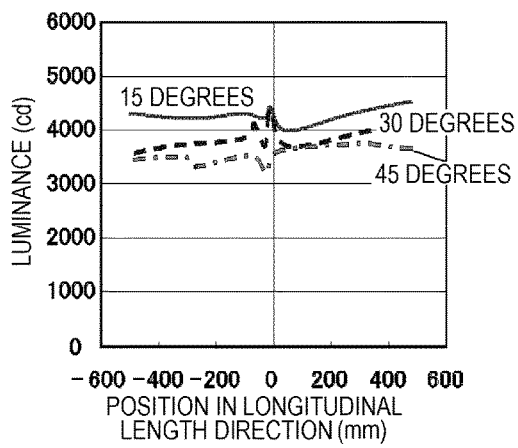

[FIG. 3C]
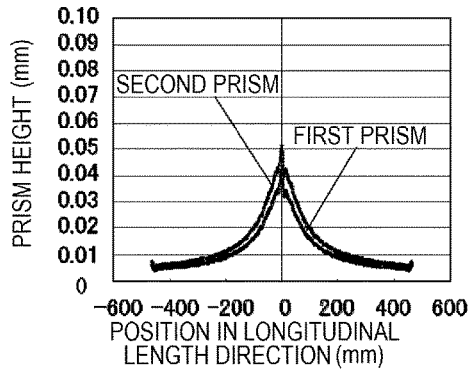
[FIG. 3D]
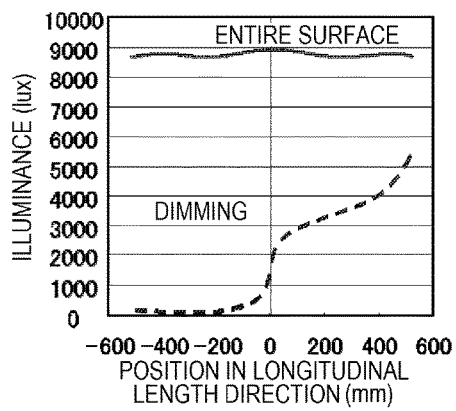
[FIG. 3E]
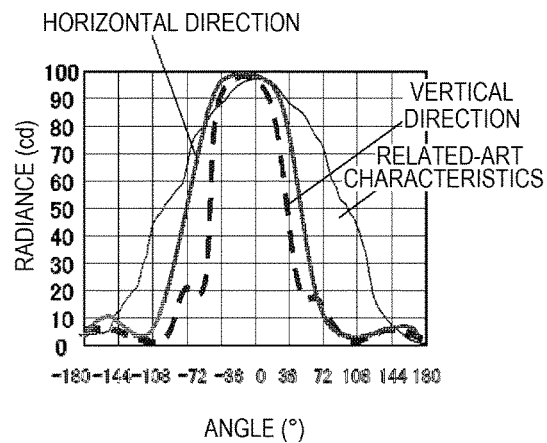

[FIG. 4A]
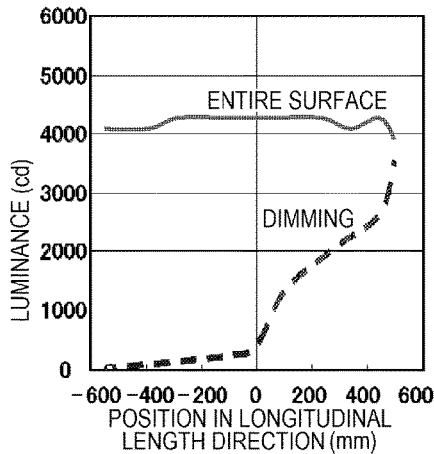
[FIG. 4B]
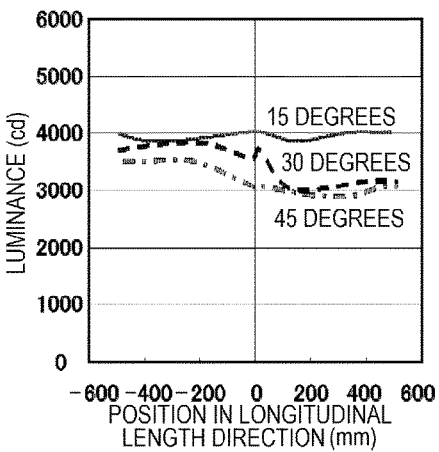
[FIG. 4C]
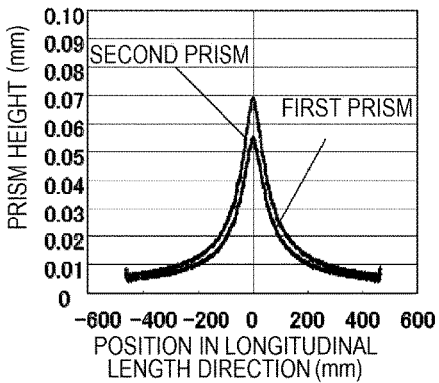

[FIG. 4D]
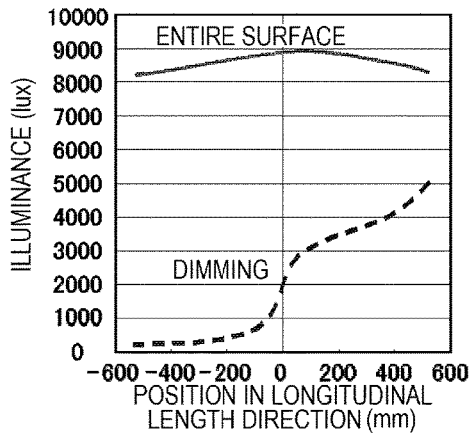
[FIG. 4E]
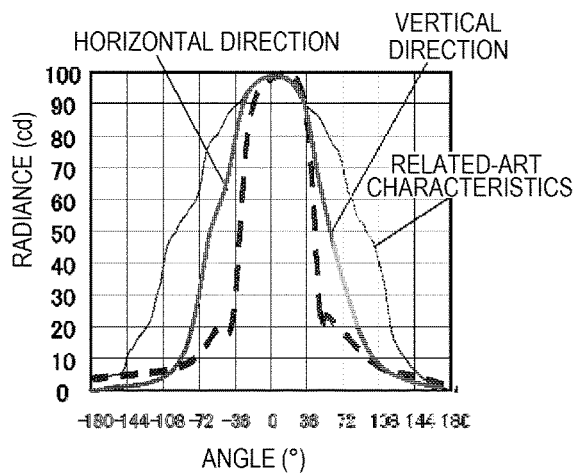
[FIG. 5A]
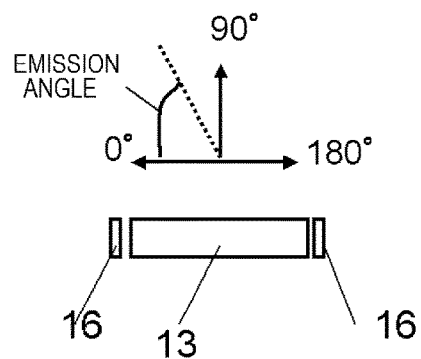

[FIG. 5B]
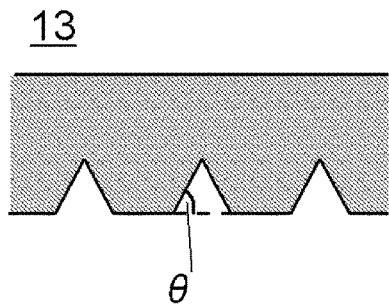
[FIG. 5C]
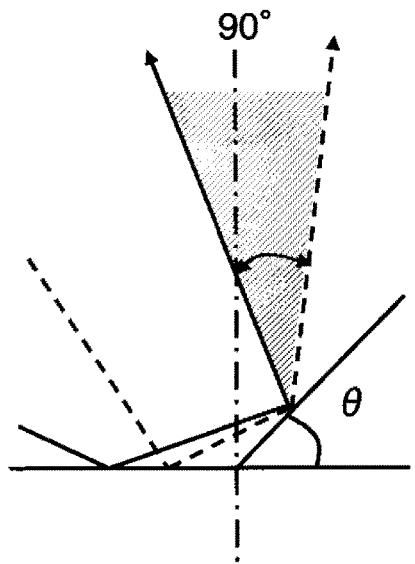
[FIG. 5D]
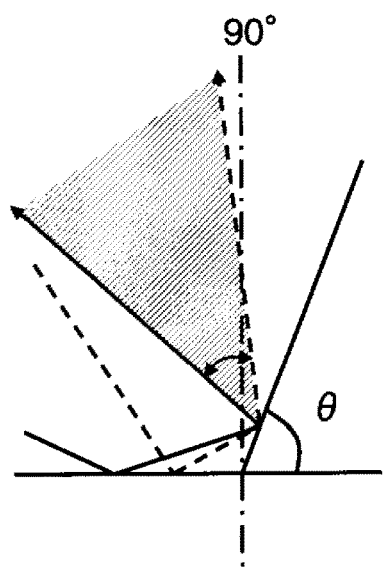

[FIG. 6A]
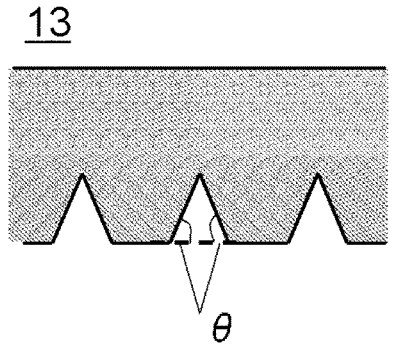
[FIG. 6B]
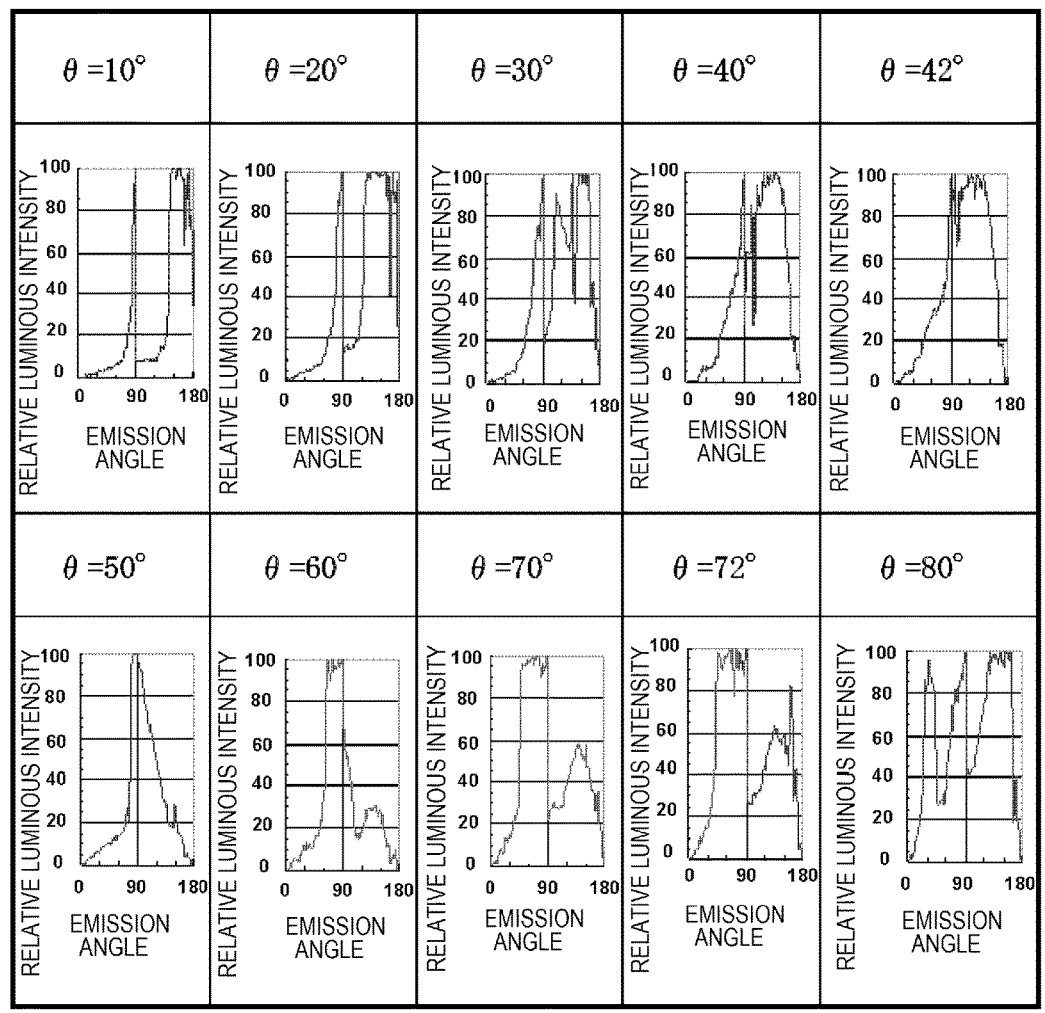

[FIG. 7A]
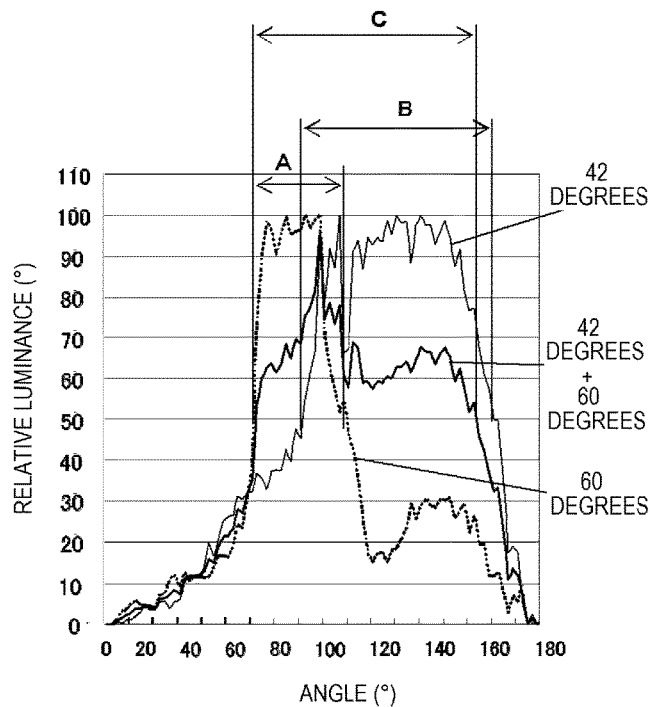
[FIG. 7B]
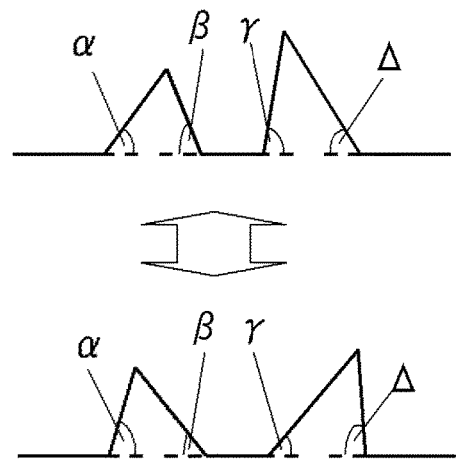

[FIG. 8A]
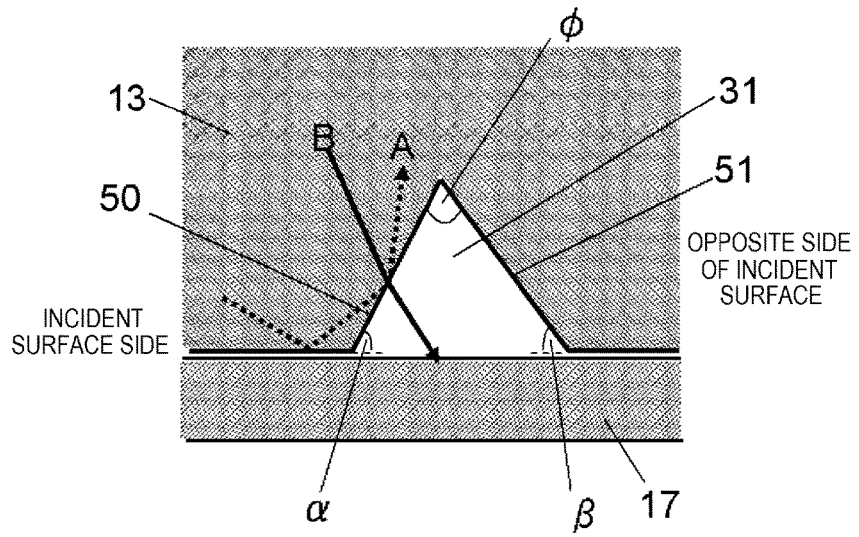
[FIG. 8B]
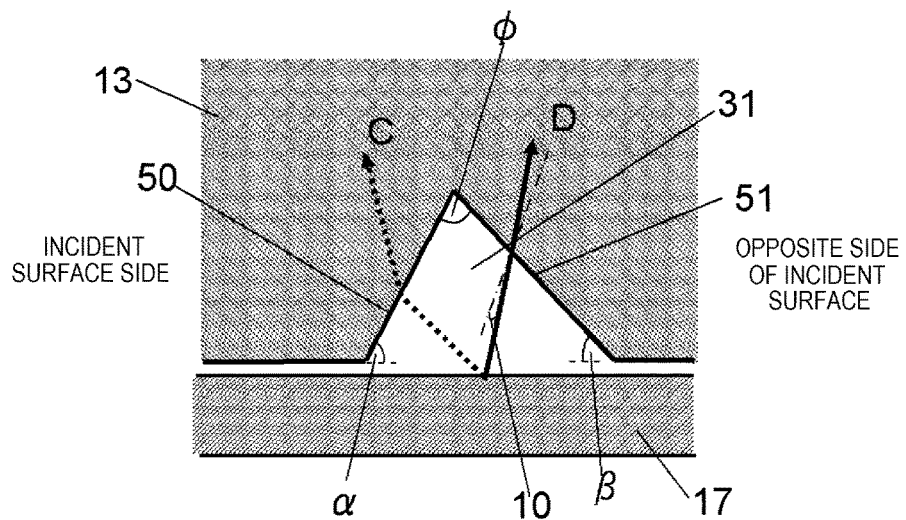
[FIG. 8C]
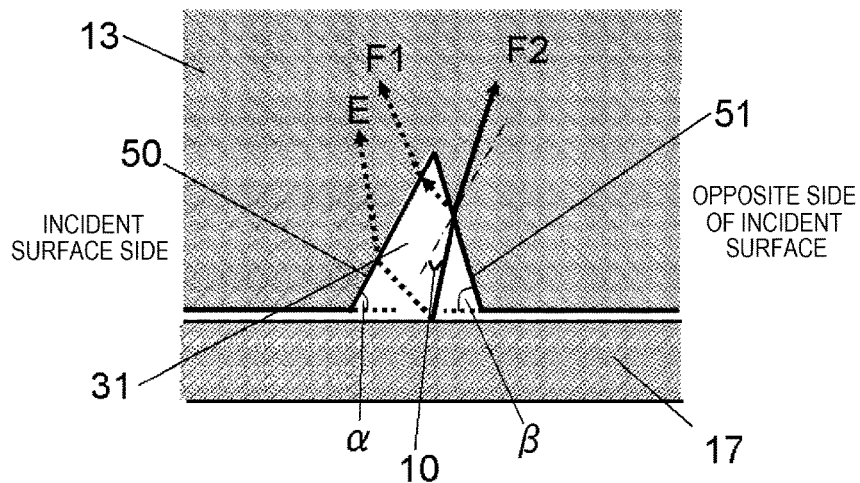

RELATED ART

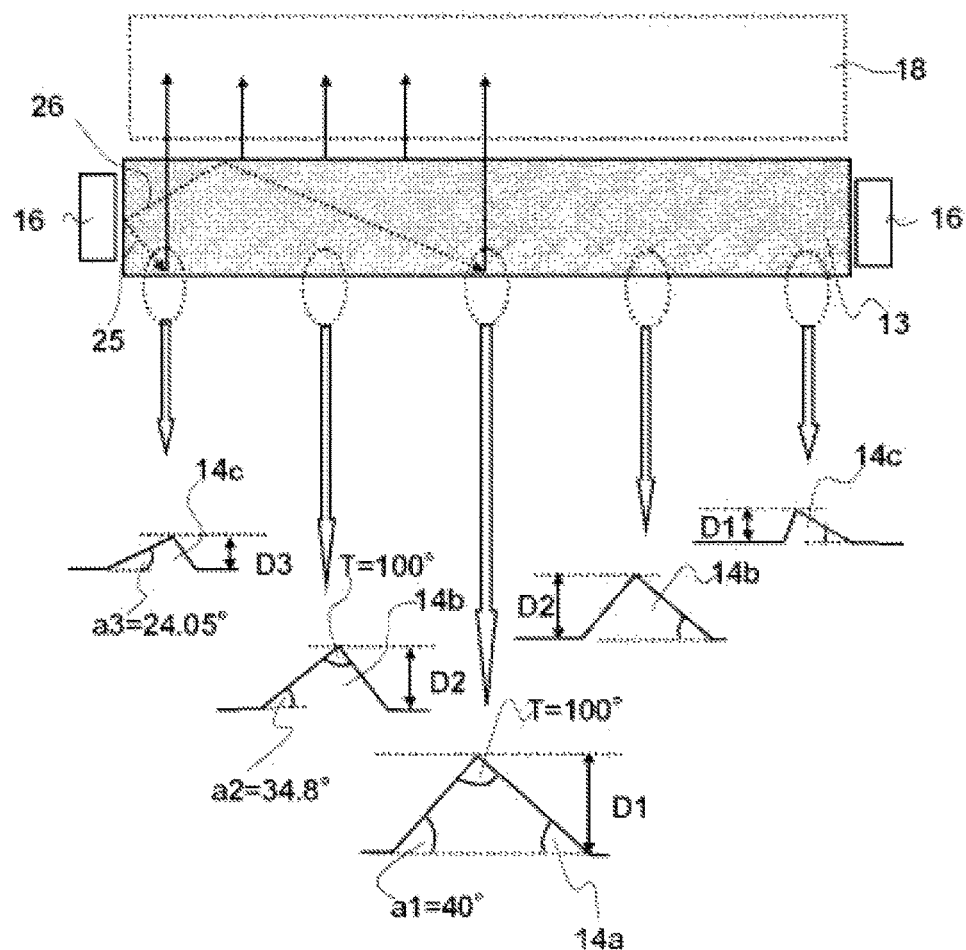
[FIG. 12]
RELATED ART

LIGHT SOURCE DEVICE

CROSS-REFERENCE TO RELATED APPLICATIONS

The present application is a U.S. national stage application of PCT International Application No. PCT/JP2013/006587 filed on Nov. 8, 2013, and claims the benefit of foreign priority to Japanese patent application 2012-249836 filed on Nov. 14, 2012, the contents all of which are incorporated by reference.

TECHNICAL FIELD

The present invention relates to a light guide plate used for an edge-light type backlight for a liquid crystal panel and for illumination.

BACKGROUND ART

A liquid crystal display device commonly requires a separate light source such as a backlight as it is not a self-luminous device. A backlight unit chiefly includes a light source and a light guide plate guiding light emitted from the light source to realize surface emission.

In general, the backlight unit is categorized into a direct-type backlight and an edge-light type backlight according to the position of the light source. In the direct-type backlight, a large number of light sources such as cold cathode lamps or LEDs (light emitting diodes) are provided just under a liquid crystal panel, in which light emitted from the light sources is diffused through plural optical sheets and irradiated to the liquid crystal display device panel. In the edge-light type backlight, a light guide plate is used, in which light sources are provided at side edges, light incident from the light sources is diffused by the light guide plate and irradiated to the liquid crystal display panel through the plural optical sheets.

FIG. 11 shows an example of an edge-light type optical module unit applying LEDs.

As shown in FIG. 11, a plural number of LEDs 16 as light sources such as positional light sources are arranged in a side surface portion of a light guide plate 13. A diffusion sheet 12 is arranged above the light guide plate 13. The diffusion sheet 12 widely diffuses light emitted from the light guide plate 13.

Moreover, a first prism sheet 20 is arranged above the diffusion sheet 12, a second prism sheet 21 is arranged above the first prism sheet 20 and an optical sheet 22 is arranged above the second prism sheet 21, which respectively collect light to a visual direction to realize high luminance. Furthermore, a reflective sheet 17 is arranged below the light guide plate 13, which returns light leaking to a lower direction from the light guide plate 13 to the light guide plate 13 again for efficiently utilizing the light.

FIG. 12 shows a structure of a related-art light guide plate 13 described in Patent Literature 1. A brief explanation of FIG. 12 will be made. The light guide plate 13, light sources including the LEDs 16 which are light generating portions arranged at both end portions of the light guide plate 13 and a group of plural combined sheets 18 which guides light from the light sources to liquid crystal cells are mainly included. Plural prisms 14a to 14c are formed at given intervals on a reflection prism surface (lower surface) of the light guide plate 13.

Cross-sectional shapes of the plural prisms 14a to 14c formed on the reflection prism surface are determined in consideration of optical paths of direct light from the LEDs 16 and reflected light emitted from the LEDs 16 and reflected on a light emitting surface. That is, when the light from the LEDs 16 is emitted to the combined sheet group 18, two types of lights exist, which are a light 25 directly proceeding to the reflection prism surface (lower surface) from the LED 16 and alight 26 proceeding to the reflection prism surface after emitted from the LED 16 and reflected on the light emitting surface once. In order to guide the light to the combined sheet group 18 efficiently, it is necessary to determine the cross-sectional shapes of prisms in consideration of these two optical paths.

A cross-sectional shape of the prism 14a at the approximately the center is an isosceles triangle in which a point angle (T°) is 100 degrees and an inclination angle (a1) is 40 degrees. A depth of the prism 14a is D1.

A cross-sectional shape of the prism 14b positioned at ¼ of the light guide plate 13 from the end thereof is a triangle in which a point angle (T°) is 100 degrees and an inclination angle (a2) is 34.8 degrees. A depth of the prism 14b is D2.

A cross-sectional shape of the prism 14c positioned at the end of the light guide plate 13 is a triangle in which a point angle (T°) is 100 degrees and an inclination angle (a3) is 24.05 degrees. A depth of the prism 14c is D3.

That is, the shapes of the prisms are set so that the tip angles T of the prisms 14a to 14c are fixed in all prisms and the inclination angles of the prisms 14a to 14c are increased from a position closer to the LED 16 toward the center, and so that the depths of the prisms become deeper from the position closer to the LED 16 toward the center.

In the structure of Patent Literature 1, the plural prisms 14a to 14d formed on the reflection prism surface of the light guide plate 13 respectively have cross-sectional shapes determined in consideration of optical paths of the direct light from the LEDs 16 and the reflected light emitted from the LEDs 16 and reflected on the light emitting surface.

Accordingly, not only the direct light from the LEDs 16 but also the reflected light emitted from the LEDs 16 and reflected on the light emitting surface can be emitted approximately perpendicularly to the light emitting surface of the light guide plate 13.

As a result, it is possible to emit light from the light guide plate 13 efficiently. However, in order to secure viewing angle characteristics and suppressing luminance non-uniformity in an angular direction as well as to improve dimming characteristics (area light-emitting characteristics), it is difficult to satisfy conflicting characteristics of viewing angle characteristics, luminance non-uniformity and dimming characteristics as the tip angle T of the prisms is one kind, and it is necessary to use two pieces of expensive prism sheets, which causes problems that the number of components in the unit is increased and the assembly becomes complicated.

Here, dimming characteristics are area light-emitting characteristics, in which the backlight is divided into plural areas and each area light emission is independently controlled, thereby improving the contrast ratio so that black potions in a screen do not emit light and bright portions emit light.

CITATION LIST

Patent Literature

PTL 1: JP-A-2004-200128

SUMMARY OF INVENTION

The present invention has been made to solve the above problems, and an object thereof is to provide the light guide plate 13 in which light is incident from an incident surface and plural prisms formed on a reflection prism surface have cross-sectional shapes determined in consideration of optical paths of direct light from the LEDs 16 and reflected light emitted from the LEDs 16 and reflected on a light emitting surface, the cross-sectional shapes are approximately V-shaped grooves, and the approximately V-shaped grooves have two or more cross-sectional shapes, which secures viewing angle characteristics and suppresses luminance non-uniformity as well as increasing front luminance and improving the dimming characteristics.

In order to achieve the above object, a light guide plate includes an incident surface on which light emitted from the light source is incident, an emitting surface emitting light incident from the incident surface and a propagating reflection surface which is a surface opposite to the emitting surface and which propagates and reflects light incident from the incident surface toward the emitting surface, in which the propagating reflection surface has approximately V-shaped grooves and the approximately V-shaped grooves have two or more kinds of cross-sectional shapes.

The light guide plate according to the present invention secures viewing angle characteristics and has high front luminance, in which the dimming characteristics are improved.

BRIEF DESCRIPTION OF DRAWINGS

FIG. 2B is a luminance-angle characteristic graph of the light guide plate according to Embodiment 1.

FIG. 2C is a prism height graph of the light guide plate according to Embodiment 1.

FIG. 2D is an illuminance distribution graph of the light guide plate according to Embodiment 1.

FIG. 2E is a viewing-angle characteristic graph of the light guide plate according to Embodiment 1.

FIG. 3A is a luminance characteristic graph of a light guide plate according to Embodiment 2.

FIG. 3B is a luminance-angle characteristic graph of the light guide plate according to Embodiment 2.

FIG. 3C is a prism height graph of the light guide plate according to Embodiment 2.

FIG. 3D is an illuminance distribution graph of the light guide plate according to Embodiment 2.

FIG. 3E is a viewing-angle characteristic graph of the light guide plate according to Embodiment 2.

FIG. 4A is a luminance characteristic graph of a light guide plate according to Embodiment 3.

FIG. 4B is a luminance-angle characteristic graph of the light guide plate according to Embodiment 3.

FIG. 4C is a prism height graph of the light guide plate according to Embodiment 3.

FIG. 4D is an illuminance distribution graph of the light guide plate according to Embodiment 3.

FIG. 4E is a viewing-angle characteristic graph of the light guide plate according to Embodiment 3.

FIG. 5A is an explanatory view of an angle of light emitted from the light guide plate.

FIG. 5B is a definition diagram of a prism angle added to a propagating reflection surface of the light guide plate.

FIG. 5C is a schematic diagram of an optical path in accordance with the change of a prism angle θ added to the propagating reflection surface of the light guide plate.

FIG. 5D is a schematic diagram of an optical path in accordance with the change of the prism angle θ added to the propagating reflection surface of the light guide plate according to the present invention.

FIG. 6A is a diagram for explaining the prism shape according to embodiments.

FIG. 6B shows graphs of relative luminous intensities in light emitting directions at the time of changing the prism angle according to embodiments.

FIG. 7A is a viewing-angle characteristic graph at the time of combining prism angles according to embodiments.

FIG. 7B is a diagram for explaining the prism shape according to embodiments.

FIG. 8A is an optical path diagram in the first prism according to embodiments.

FIG. 8B is an optical path diagram in the first prism according to embodiments.

FIG. 8C is an optical path diagram in the first prism according to embodiments.

FIG. 12 is a cross-sectional view of a light guide plate according to a related-art example.

DESCRIPTION OF EMBODIMENTS

Hereinafter, embodiments of the present invention will be explained with reference to the drawings.

Figure 1:
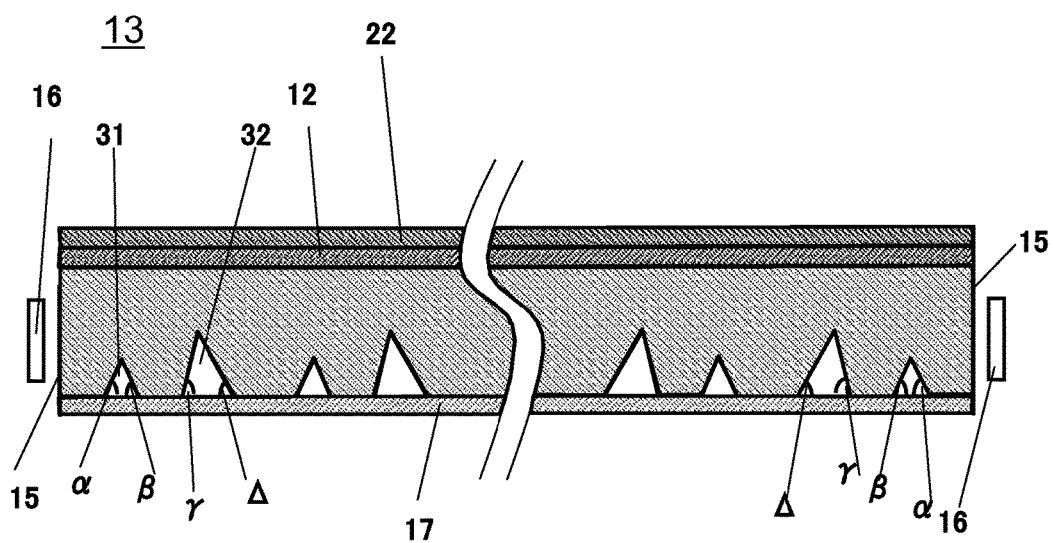
FIG. 1 is a schematic cross-sectional view of a light guide plate for explaining a basic state of embodiments.

A basic structure of a light guide plate 13 according to the embodiments will be explained with reference to FIG. 1. FIG. 1 is a view showing a schematic cross section of the light guide plate 13 according to the embodiments, which includes LEDs 16, the light guide plate 13, incident surface 15, a reflective sheet 17, a diffusion sheet 12 and an optical sheet 22.

The LEDs 16 are light sources such as point light sources, and a plural number of LEDs 16 are respectively arranged in the vicinity of side surfaces of two places on the short sides of the light guide plate 13 as shown in FIG. 1.

The light guide plate 13 is made of a transparent resin (for example, an acrylic resin and polycarbonate) and so on, in which first prisms 31 forming first grooves and second prisms 32 forming second grooves are alternately provided on a reflection surface side (lower surface) of the light guide plate 13 for reflecting light in an upper direction.

The first prism 31 and the second prism. 32 are arranged so that two kinds of prisms having different shapes are separated, in which two prisms make one pair to be arranged repeatedly. Concerning intervals, the first prisms 31 and the second prisms 32 are arranged so that the regular arrangement is repeated at equal pitches.

The reflective sheet 17 has a function of inputting light emitted from the light guide plate 13 to the light guide plate 13 again for utilizing light leaking from the light guide plate 13 effectively.

The diffusion sheet 12 has a function of diffusing light emitted from an upper surface of the light guide plate 13. The optical sheet 22 is further provided above the diffusion sheet 12 for realizing high luminance. The prism sheet is necessary in the related art example, and two types of prisms are not necessary in the light guide plate 13 in the system.

The light emitted from the LEDs 16 is allowed to have a characteristic of mainly increasing the front luminance in the first prisms 31 and a characteristic of mainly increasing a viewing angle in the second prisms 32, which can realize both conflicting characteristics of increasing the viewing angle and increasing the front luminance as well as improving the dimming characteristics by combining these prisms.

Furthermore, an angle α of the first prisms 31 mainly contributes to the improvement of the front luminance and an angle β mainly contributes to the improvement of the dimming characteristics. An angle γ of the second prisms 32 mainly contributes to the control of the viewing angle characteristics and an angle Δ contributes to the control of the viewing angle characteristics.

When the angle α of the first prisms 31 is within a range of $42°<\alpha<60°$, the front luminance can be increased. When the angle γ of the second prisms 32 is within a range of $60°<\gamma<72°$, the viewing angle characteristics can be increased.

It is possible to change the angle according to the position as long as the angles are within the ranges of $42°<\alpha<60°$ and $60°<\gamma<72°$. Plural types of prisms can be used within the angle conditions.

It is further possible to improve the dimming characteristics and reduce local luminance non-uniformity by setting the sum of slope angles (α+β) of the first prism 31 and the sum of slope angles (γ+Δ) of the second prism 32 to angles of 90 degrees or more respectively.

The angle range will be explained in the following Embodiments 1 to 3.

The basic structure of the embodiments is one in which the LEDs 16 are arranged on both sides of the light guide plate 13, however, the same advantages can be obtained even when the LEDs 16 are arranged only at either one end.

The interval between the first prism 31 and the second prism 32 added to the reflection surface side of the light guide plate 13 may be changed according to the position. It is preferable that grooves which are almost perpendicular to prism grooves formed on the lower surface are formed on an upper surface of the light guide plate 13.

(Embodiment 1)

Embodiment 1 of the present invention will be explained with reference to FIG. 1 and FIGS. 2A to 2E.

In the light guide plate 13 according to Embodiment 1, angles of the first prisms 31 and the second prisms 32 in FIG. 1 are respectively, the angle α: 42°, the angle β: 62°, the angle γ: 68° and the angle Δ: 48°, and the first prisms 31 and the second prisms 32 are repeatedly provided.

FIG. 2A to 2E show optical simulation results of the light guide plate 13 in the above case.

Figure 2A:
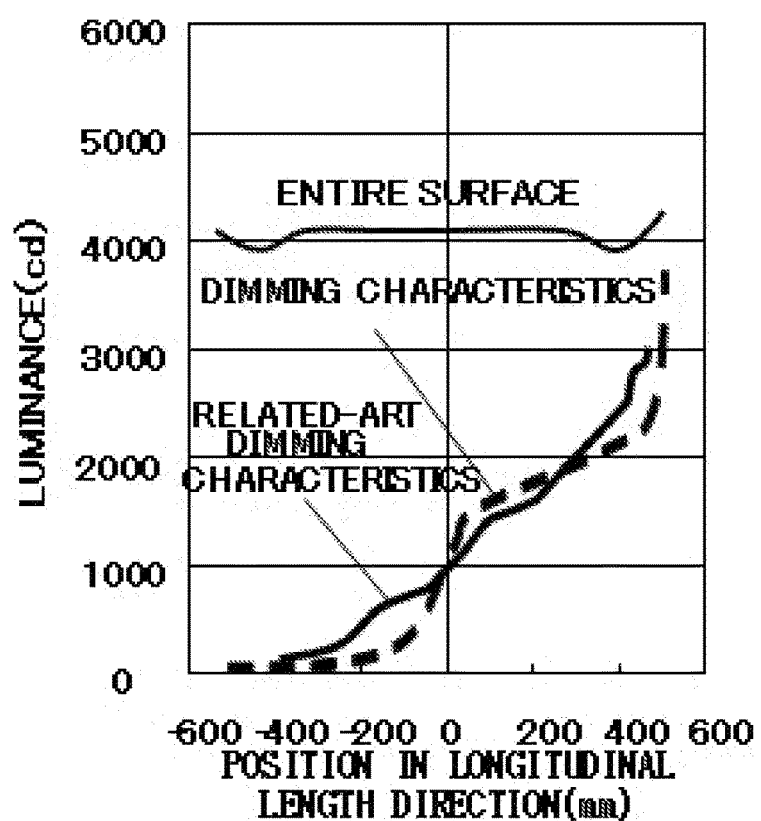
FIG. 2A is a luminance characteristic graph of the light guide plate according to Embodiment 1.

FIG. 2A shows a luminance characteristic graph, in which a horizontal axis indicates the length in the longitudinal direction of the light guide plate 13 and a vertical axis indicates the luminance. FIG. 2A shows luminance distribution obtained when both sides of LEDs 16 emit light. The dimming characteristics were also measured by allowing the LEDs 16 at one side of the light guide plate 13 to emit light.

Figure 11:
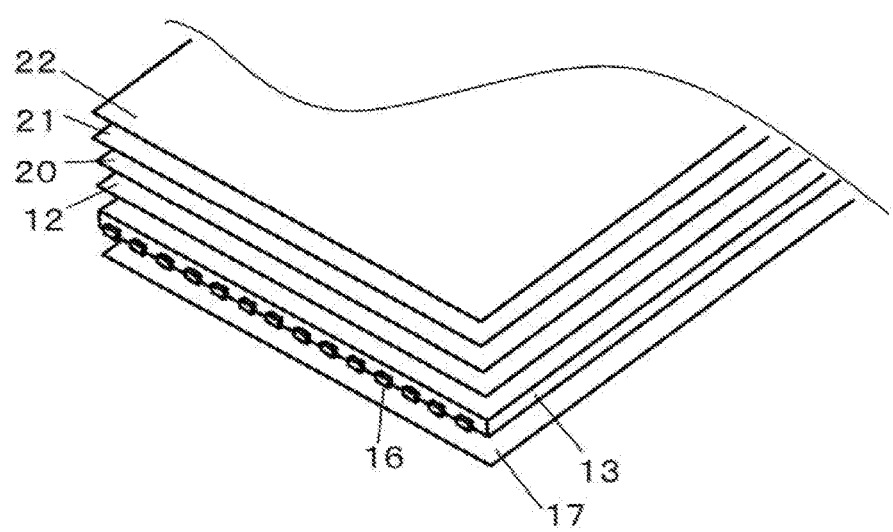
FIG. 11 is a view showing an example of an edge-light type optical module unit applying LEDs in related art.

As shown in FIG. 2A, it is found that the luminance uniformity is good when the entire surface emits light, and the dimming characteristics are better than related art. Data of dimming in related art is data of dimming characteristics with respect to the related-art light guide plate 13 shown in FIG. 11. Here, the dimming characteristics show the contrast (optical sharpness), and the luminance difference in the vicinity of the center is preferably large (a gradient is preferably large).

FIG. 2B is a luminance-angle characteristic graph. A horizontal axis indicates the longitudinal direction length of the light guide plate 13 and a vertical axis indicates the luminance. The almost equivalent characteristics are shown even when the viewing angle changes (15°, 30° and 45°), that is, uniform and good angle characteristics are shown even at the angle 45°. Here, the angle means an angle made by a perpendicular line standing on the surface of the light guide plate 13.

FIG. 2C is a graph showing the prism height of the light guide plate 13. A horizontal axis indicates the longitudinal direction length of the light guide plate 13 and a vertical axis indicates the prism height. The height dimensions of the first prisms 31 and the second prisms 32 are shown, and the prism height is gradually changed in Embodiment 1.

FIG. 2D is an illuminance distribution graph, in which a horizontal axis indicates the longitudinal direction length of the light guide plate 13 and a vertical axis indicates the illuminance. Uniform characteristics in the longitudinal direction, namely, good characteristics are shown in the entire screen in the same manner as front luminance characteristics. The dimming characteristics obtained when the LEDs 16 are only on one side emit light are also good.

FIG. 2E is a viewing-angle characteristic diagram, in which a horizontal axis indicates the angle with respect to the perpendicular line vertically standing on the surface of the light guide plate 13 and a vertical axis indicates the relative intensity (luminance). The characteristics in the horizontal direction and the vertical directions are approximately equivalent and these characteristics are concentrated to the central angle as compared with related art characteristics, therefore, the front luminance is brighter and visibility is good.

(Embodiment 2)

Embodiment 2 of the present invention will be explained with reference to FIG. 1 and FIGS. 3A to 3E.

In the light guide plate 13 according to Embodiment 2, angles of the first prisms 31 and the second prisms 32 in FIG. 1 are respectively, the angle α: 52°, the angle β: 52°, the angle γ: 72° and the angle Δ: 32°, and the first prisms 31 and the second prisms 32 are repeatedly provided.

FIG. 3A to 3E show optical simulation results in the above prism shapes. The vertical axes and the horizontal axes of the drawings indicate the same as those in FIG. 2A to 2E.

FIG. 3A is a luminance characteristic graph. A horizontal axis indicates the longitudinal direction length of the light guide plate 13 and a vertical axis indicates the luminance. The luminance uniformity on the entire surface is good and the dimming characteristics are better than related-art dimming characteristics.

FIG. 3B is a luminance-angle characteristic graph, in which the almost equivalent characteristics are shown even when the viewing angle changes, that is, uniform and good angle characteristics are shown even at the angle 45°.

FIG. 3C is a graph showing the prism height of the light guide plate 13, in which the height dimensions of the first prisms 31 and the second prisms 32 are shown, and the prism height is gradually changed.

FIG. 3D is an illuminance distribution graph, in which uniform characteristics in the longitudinal direction, namely, good characteristics are shown in the entire screen in the same manner as luminance characteristics.

FIG. 3E is a viewing-angle characteristic diagram, in which characteristics in the horizontal direction and the vertical directions are approximately equivalent and better than related-art characteristics.

(Embodiment 3)

Embodiment 3 of the present invention will be explained with reference to FIG. 1 and FIGS. 4A to 4E. In the light guide plate 13 according to Embodiment 3, angles of the first prisms 31 and the second prisms 32 in FIG. 1 are respectively, the angle α: 52°, the angle β: 52°, the angle γ: 75° and the angle Δ: 27°, and the first prisms 31 and the second prisms 32 are repeatedly provided.

FIG. 4A to 4E show optical simulation results in the prism shapes in this case. The vertical axis and the horizontal axis of the drawings indicate the same as those in FIG. 2A to 2E.

FIG. 4A is a luminance characteristic graph. A horizontal axis indicates the longitudinal direction length of the light guide plate 13 and a vertical axis indicates the luminance. The luminance uniformity on the entire surface is good and the dimming characteristics are better than related-art dimming characteristics.

FIG. 4B is a luminance-angle characteristic graph, in which the almost equivalent characteristics are shown even when the viewing angle changes, that is, uniform and good angle characteristics are shown even at the angle 45°.

FIG. 4C is a graph showing the prism height, in which the height dimensions of the first prisms 31 and the second prisms 32 are shown, and the prism height is gradually changed. In FIG. 2C, FIG. 3C and FIG. 4C, the prism height is changed in accordance with angles α, β, γ and Δ. The height is set to be increased toward the inner position so that incident light is received by respective prisms uniformly.

FIG. 4D is an illuminance distribution graph of the light guide plate 13, in which uniform characteristics in the longitudinal direction, namely, good characteristics are shown in the entire screen in the same manner as luminance characteristics.

FIG. 4E is a viewing-angle characteristic diagram of the light guide plate 13, in which characteristics in the horizontal direction and the vertical directions are approximately equivalent and better than related-art characteristics shown in FIG. 4E.

In FIG. 2C, FIG. 3C and FIG. 4C, the prism height is changed in accordance with the position. That is, the prism height is increased toward the inner position, namely, the inside for making uniform the luminance distribution according to respective angles. Parabolic curves are shown. Depths of the first grooves and the second grooves become deeper from the incident surface toward the center of the light guide plate. When the horizontal axis indicates the distance from the incident surface and the vertical axis indicates the depth of the first and second grooves, parabolas indicate depth variations.

Embodiments 1 to 3 are summarized in the following table 1.

In the results of Table 1, the angle α of the first prisms 31 is within a range of 42°≤α≤52° and the angle γ of the second prisms 32 is within a range of 68°≤β≤75° as shown in the above. The sum of slope angles (α+β) of the first prism 31 and the sum of slope angles (γ+Δ) of the second prism 32 are respectively angles of 104° or more as well as 102° or more.

Furthermore, angle ranges will be explained in detail with reference to FIGS. 5A to 5D and FIGS. 9A and 9B.

[Schematic Explanation]

FIG. 5A is a view for explaining an emission angle of light emitted from the light guide plate 13. As shown in FIG. 5A, the emission angle defines the angle of light emitted from the light guide plate 13 as an opening angle from the emission surface.

FIG. 5B is a definition diagram of a prism angle θ added to a propagating reflection surface of the light guide plate 13. FIG. 5C and FIG. 5D show examples of schematic diagrams of optical paths in accordance with the change of the prism angle θ added to the propagating reflection surface of the light guide plate 13. Courses of light are shown by arrows.

FIG. 5C shows a case where the prism angle θ is in a range of 42° to 60°. In this case, much light can be emitted in the vicinity of a direction of 90°, which can improve the front luminance. However, as light is concentrated in the vicinity of the emission angle of 90°, the viewing angle is narrowed. For example, when the prism angle is 60°, a spread angle at which the brightness becomes half of the maximum brightness 100 is approximately 35°. The spread angles are shown by spreads indicated by hatching in FIG. 5C and FIG. 5D.

On the other hand, when the prism angle θ is in a range of 60° to 72° as shown in FIG. 5D, much light can be emitted to directions of angles smaller than 90°, namely, in the direction of the incident surface, therefore, the viewing angle can be widened. For example, when the prism angle θ is 72°, a spread angle at which the brightness becomes half of the maximum brightness 100 is approximately 70°.

As can be seen from the above, the cross-sectional shapes including two or more kinds of prisms having the above angle ranges are used with good balance, the viewing angle characteristics, the front luminance and dimming characteristics can be satisfied. That is, it is preferable that the prism emitting light in the direction of 90 degrees and the prism emitting light in directions smaller than 90 degrees are alternately provided.

[Explanation with Simulation]

The detailed explanation will be made with reference to FIG. 6A and FIG. 6B. FIG. 6A is a definition diagram of a prism angle θ added to a propagating reflection surface of the light guide plate 13. In this case, the prism shape is defined as an isosceles triangle and angles of a base is defined as the prism angle θ, and verification was performed by changing the prism angle θ as described below.

TABLE 1

| | First Prism | | | Second Prism | | | Dimming | |
|---|---|---|---|---|---|---|---|---|
| | α | β | α + β | γ | Δ | γ + Δ | Optical characteristics | characteristics |
| Embodiment 1 | 42 | 62 | 104 | 68 | 48 | 116 | good | good |
| Embodiment 2 | 52 | 52 | 104 | 72 | 32 | 104 | good | good |
| Embodiment 3 | 52 | 52 | 104 | 75 | 27 | 102 | good | good |
| Related-Art Example | | Tip angle T is fixed to 100° and slope angle gradually changes | | | | | | |
| | 24.5 | 55.95 | 80.45 | 34.8 | 45.2 | 80 | poor | poor |

In FIG. 6B, emission directions of light from the light guide plate 13 are shown as emission angles 0° to 180° from the LED 16 side shown in FIG. 5A. Distribution examples of relative luminous intensities obtained by optical analysis while changing the prism angle θ are shown.

[The Prism Angle θ, the Prism Emitting Light in the Direction of 90 Degrees, Countermeasures Taken with Respect to FIG. 5C]

First, the range of the angle α (FIG. 1) will be explained. As shown in FIG. 6B, the relative luminous intensity is reduced in the vicinity of the emission angle 90° when the prism angle θ is smaller than 42°. As there are plural ridges and valleys of relative luminous intensities, angles with bright views and angles with dark views exist when viewing directions of the light emission surface is changed, which deteriorates the visibility.

On the other hand, in a range of the prism angles θ 42° to 60°, it is found that much light can be emitted in the vicinity of the emission angle 90° (the direction in which the front luminance is improved) and that plural ridges and valleys of relative luminous intensities do not exist. It is also found that light can be emitted in the front direction most efficiently in the vicinity of the prism angle 50°. For these reasons, the range in which the front luminance is increased is preferably 42°<prism angle θ<60°.

[The Prism Angle θ, the Prism Emitting Light in Directions Smaller than 90 Degrees, Countermeasures Taken with Respect to FIG. 5D]

Next, the range of the angle γ (FIG. 1) will be explained. As shown in FIG. 6B, when the prism angle θ is larger than 60°, light is spread to the incident surface direction and the light is dispersed as the relative luminous intensity in areas with smaller emission angles is increased, therefore, it is possible to lead the light to directions in which the viewing angle is widened.

It is further found that, within a range smaller than the prism angle 72°, light can be led to directions in the incident surface direction in which light is spread and the viewing angle is widened. For these reasons, the range in which the viewing angle is widened is preferably 60°<prism angle θ<72°. However, the relative luminous intensity is reduced in the vicinity of the emission angle 90° in these areas.

Consequently, cross-sectional shapes including prisms with the first prism angle α of 42°<α<60° and prisms with the second prism angle γ of 60°<γ<72° are used with good balance, the viewing angle characteristics, the improvement of the front luminance and the dimming characteristics can be satisfied.

An example of the above is shown in FIG. 7A. FIG. 7A shows variations of relative luminous intensities in the case where only prisms with the prism angle θ of 42° (isosceles triangles) are used, the case where only prisms with the prism angle θ of 60° (isosceles triangles) are used and the case where two kinds of prisms with prism angle θ of 42° and the prism angle θ of 60° (angles in the base are two kinds, not isosceles triangles) are used.

As shown in FIG. 7A, when the prism angle θ is 42°, a spread angle B at which the brightness becomes half of the maximum luminous intensity 100 is 77°.

When the prism angle is 60°, a spread angle A is 35°. That is, it is difficult to satisfy the viewing angle characteristics, the front luminance and the dimming characteristics in the prism shape of one kind.

Accordingly, when these angles are combined (two kinds of angles 42° and 60° are used), a spread angle C at which the brightness becomes half can be expanded to 90° as well as the front luminance can be increased.

According to the above results, it is possible to satisfy the viewing angle characteristics, the front luminance and the dimming characteristics in the range of 42°<the angle α<60° as well as 60°<the angle γ<72°.

Similarly, the same applies to the case where light is incident from the opposite direction, and it is possible to satisfy the viewing angle characteristics, the front luminance and the dimming characteristics in the range of 42°<the angle Δ<60° as well as 60°<the angle β<72°. As a result, α<β and γ>Δ.

The first prism and the second prism can be interchanged as shown in FIG. 7B as long as they are alternately positioned. In this case, α and γ are interchanged and β and Δ are interchanged. The light can be reflected uniformly as the prisms are alternately positioned.

Here, the reasons that 42°<the angle β<60° as well as 60°<the angle Δ<72° are not applicable will be shown below, which is because of the angle of an apex angle φ.

[It is Preferable that the Sum (Angle α+Angle β) and the Sum (Angle γ+Angle Δ) are Preferably 90° or More]

Next, the reason that the sum (angle α+angle β) and the sum (angle γ+angle Δ) are preferably 90° or more, and the reason that it is preferable that the angle α<the angle β<90° will be explained.

FIG. 8A to 8C show examples of optical path diagrams of prisms. As shown in FIG. 8A, there exists a light ray to be taken by a slope of the prism added to the light guide plate 13 with the total reflection (for example, a light ray A in the drawing), however, part of light goes to the reflective sheet 17 side through the prism slope without being totally reflected (for example, a light ray B in the drawing). Then, the light reflected on the reflective sheet 17 is incident on a slope 50 and a slope 51 again, which are formed with the angle α and the angle β.

[FIG. 8B: Case where the Apex Angle φ is 90 Degrees or More]

When the light reflected on the reflective sheet 17 is incident on the slope 50 again (for example, a light ray C in the drawing), much light propagates in the direction of the incident surface, which improves the dimming characteristics.

On the other hand, the light reflected on the reflection sheet 17 is incident on the slope 51 again (for example, a light ray D in the drawing), an incident angle 10 is a sharp angle, therefore, light is liable to proceed as shown in the drawing and the light easily propagates to the opposite side of the incident surface, which deteriorates the dimming characteristics.

[FIG. 8C: Case where the Apex Angle φ is Smaller than 90°]

When the light reflected on the reflective sheet 17 is incident on the slope 50 again (for example, a light ray E in the drawing), much light propagates in the direction of the incident surface, which improves the dimming characteristics.

On the other hand, when the light is incident on the slope 51 again (for example, light rays F1 and F2 in the drawing), the incident angle 10 is large, therefore, components reflected on the slope 51 is increased and the light amount to be incident on the slope 50 again is increased as the light path (F1) shown by a broken line in the drawing. As a result, the light amount propagated to the opposite side of the light incident surface is reduced, which improves the dimming characteristics.

[When Angle α+Angle β is Smaller than 90°]

When α+β is a smaller angle than 90°, the incident angle to the slope 51 is liable to be a sharp angle as shown in FIG.

8B, therefore, the dimming characteristics deteriorate and the following problems occur as compared with the case where α+β is 90° or more.

[From a Viewpoint of Physical Luminance]

Figure 9A:
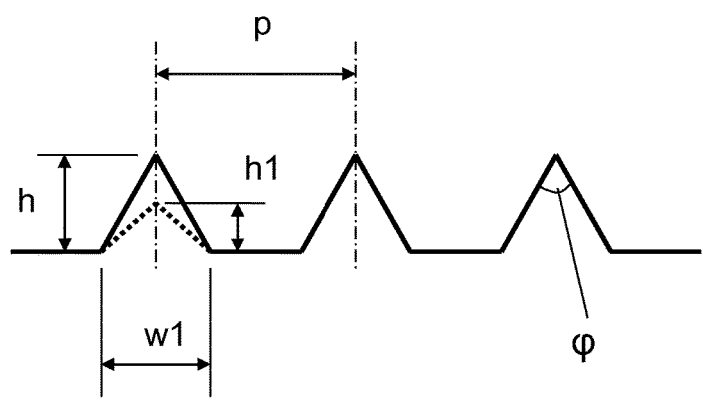
FIG. 9A is a diagram for explaining the prism shape according to embodiments.
Figure 9B:
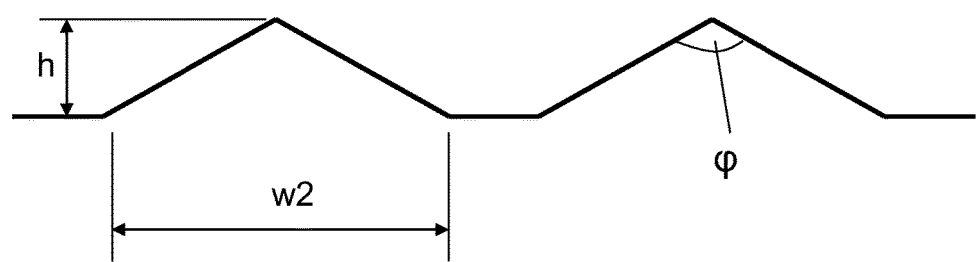
FIG. 9B is a diagram for explaining the prism shape according to embodiments.

FIGS. 9A and 9B show prism shapes. When the prism width is "w1" as shown in FIG. 9A, the height of the prism is reduced (for example, "h1" of FIG. 9A) as the apex angle φ is increased (angle α+angle β is smaller than 90°), as a result, the amount of received light is reduced.

Here, it is necessary to increase a prism height "h" as shown in FIG. 9B for securing the luminance without changing the apex angle φ. It is inevitably necessary to set the prism width from "w1" to "w2" for increasing the prism height "h" (From FIG. 9A to FIG. 9B), therefore, it is also necessary to set a prism pitch "p" to be wide.

As the light amount to be taken by one prism is increased when the prism pitch "p" is set to be wide (rough), local luminance non-uniformity is liable to occur due to the existence of the prism.

Accordingly, it is preferable that the apex angle φ is a sharp angle and that the angle α+the angle β is larger than 90°.

[From a Viewpoint of Manufacturing]

The cross-sectional shape of prisms to be formed has an approximately V-shape, and the angle α and the angle β are preferably smaller than 90 degrees also from a viewpoint of manufacturing. The upper limit may be changed appropriately in consideration of the relation with respect to a thickness of the light guide plate, the balance of luminance distribution and productivity. The same applies to the angle γ+the angle Δ.

For the above reasons, the sum of slope angles (α+β) and the sum of slope angles (γ+Δ) are preferably larger than 90°, and it is also preferable that α<β90° and Δ<γ<90°.

[Height and Width of Prisms]

Figure 10A:
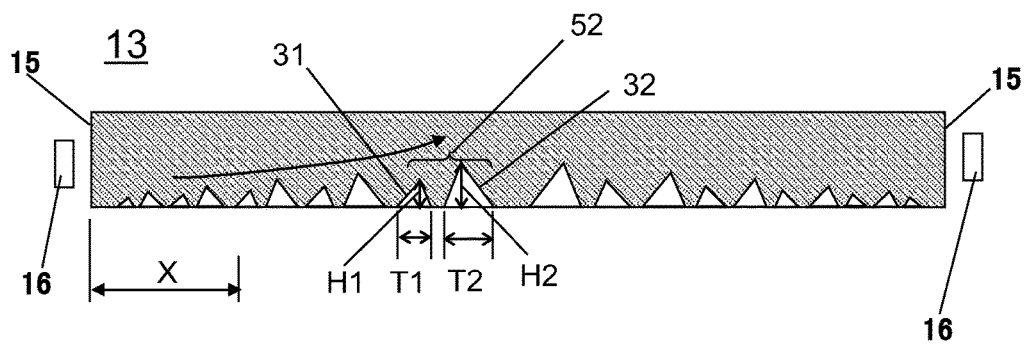
FIG. 10A is a cross-sectional view of the light guide plate according to embodiment.

The angles of prisms have been explained in the above Embodiments 1 to 3. Hereinafter, the relation between the width T and the height H of prisms will be explained. FIG. 10A shows a cross sectional view of the light guide plate 13. The prisms are shown in a state of reducing the number thereof for simplifying the drawing. The LEDs 16 are provided on both end surfaces of the light guide plate 13.

A unit 52 including the first prism 31 and the second prism 32 is repeated. The prisms respectively have widths T1, T2 and the heights H1, H2, which are different according to the place. Each first prism 31 and each second prism 32 have similar shapes.

Figure 10B:
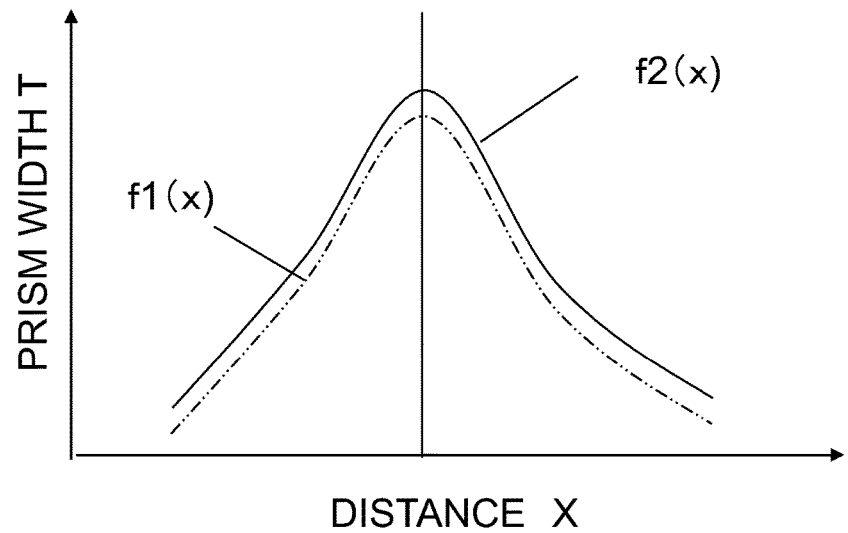
FIG. 10B is a diagram showing variations of a prism width in the light guide plate according to embodiments.

FIG. 10B shows the relation between the distance "x" from an end of the light guide plate 13 and the widths T1, T2. "f1(x)" is a function of the width T1 and "f2(x)" is a function of the width T2. In respective "x", f1(x)<f2(x). The width is increased toward the center.

The functions are the same in which the height is also increased toward the center though the height is not shown because of the similar shapes. The prisms become larger toward the center, which can reflect much light to be radiated to the outside. The change is not discontinuous and is smooth. Increase is monotonous, the change is gradual at the peak and the decrease is monotonous.

When the LEDs 16 are provided on one side of the light guide plate 13, only monotonous increase (decrease) occurs.

[Interval Between the First Prism 31 and the Second Prism 32]

(Explanation of the Interval)

As an interval between the first prism 31 and the second prism 32 (the shortest distance between prisms), the first prism 31 and the second prism 32 at least may not overlap each other as effects of light reflection due to the slopes are reduced if they overlap each other.

As there are problems concerning a manufacturing method and problems of the interference of light between prisms when the interval is reduced, the interval is preferably half or more the minimum depth of prisms.

When the interval between the first prism 31 and the second prism 32 is widened, the number of prisms is reduced, the light reflection is reduced, the luminance is reduced and non-uniformity is liable to occur as a whole.

The prism height may not exceed 10% of the thickness of the light guide plate 13 for securing the transmission of light. The prism height is preferably set so as not to exceed 5%.

It is preferable that many prisms are provided in the above ranges of angles and intervals.

INDUSTRIAL APPLICABILITY

The present invention can be applied to backlights of a liquid crystal television, a notebook personal computer, and light emitting devices of illuminating devices.

REFERENCE SIGNS LIST 10 incident angle
12 diffusion sheet
13 light guide plate
14a, 14b and 14c prism
16 LED (light source)
17 reflective sheet
18 combined sheet group
20 first prism sheet
21 second prism sheet
22 optical sheet
25, 26 light
31 first prism (first groove)
32 second prism (second groove)
50, 51 slope
52 unit
φ apex angle

The invention claimed is:

1. A light source device comprising:
a light source; and
a light guide plate,
wherein the light guide plate includes an incident surface on which light emitted from the light source is incident, an emission surface emitting light incident from the incident surface, and a propagating reflection surface which is a surface opposite to the emission surface and which propagates and reflects the light incident from the incident surface toward the emission surface,
the propagating reflection surface has V-shaped grooves and the V-shaped grooves are formed by repetition of two kinds of cross-sectional shapes,
the two kinds of V-shaped grooves have first grooves and second grooves alternately aligned from the incident surface,
angles made by the first groove and the propagating reflection surface are α, β and angles made by the second groove and the propagating reflection surface are γ, Δ, the α is in a range from 42 degrees to 60 degrees and the γ is in a range from 60 degrees to 72 degrees, and
the Δ is in a range from 42 degrees to 60 degrees and the β is in a range from 60 degrees to 72 degrees.

2. The light source device according to claim 1,
wherein the incident surface is positioned at each of both ends of the light guide plate, and
a depth of the first grooves and the second grooves becomes deeper from the incident surfaces toward a center of the light guide plate.

3. The light source device according to claim 2,
wherein, when a distance from the incident surface is indicated in a horizontal axis and the depth of the first and second grooves is indicated in a vertical axis, variations of the depth are expressed as parabolas.

4. The light source device according to claim 3,
wherein the parabola of the second grooves is positioned above the parabola of the first grooves in the vertical axis.

5. The light source device according claim 4,
wherein only one kind of a diffusion sheet for diffusing light and only one kind of optical sheet for collecting the light are provided on the emission surface of the light guide plate.

6. The light source device according to claim 5,
wherein a prism sheet is not provided on the emission surface.

7. The light source device according to claim 3,
wherein only one kind of a diffusion sheet for diffusing light and only one kind of optical sheet for collecting the light are provided on the emission surface of the light guide plate.

8. The light source device according to claim 2,
wherein only one kind of a diffusion sheet for diffusing light and only one kind of optical sheet for collecting the light are provided on the emission surface of the light guide plate.

9. The light source device according to claim 1,
wherein only one kind of a diffusion sheet for diffusing light and only one kind of optical sheet for collecting the light are provided on the emission surface of the light guide plate.

* * * * *